JOHN STOCK & JACOB STOCK.
Improvement in Photographic Cameras.
No. 115,655. Patented June 6, 1871.
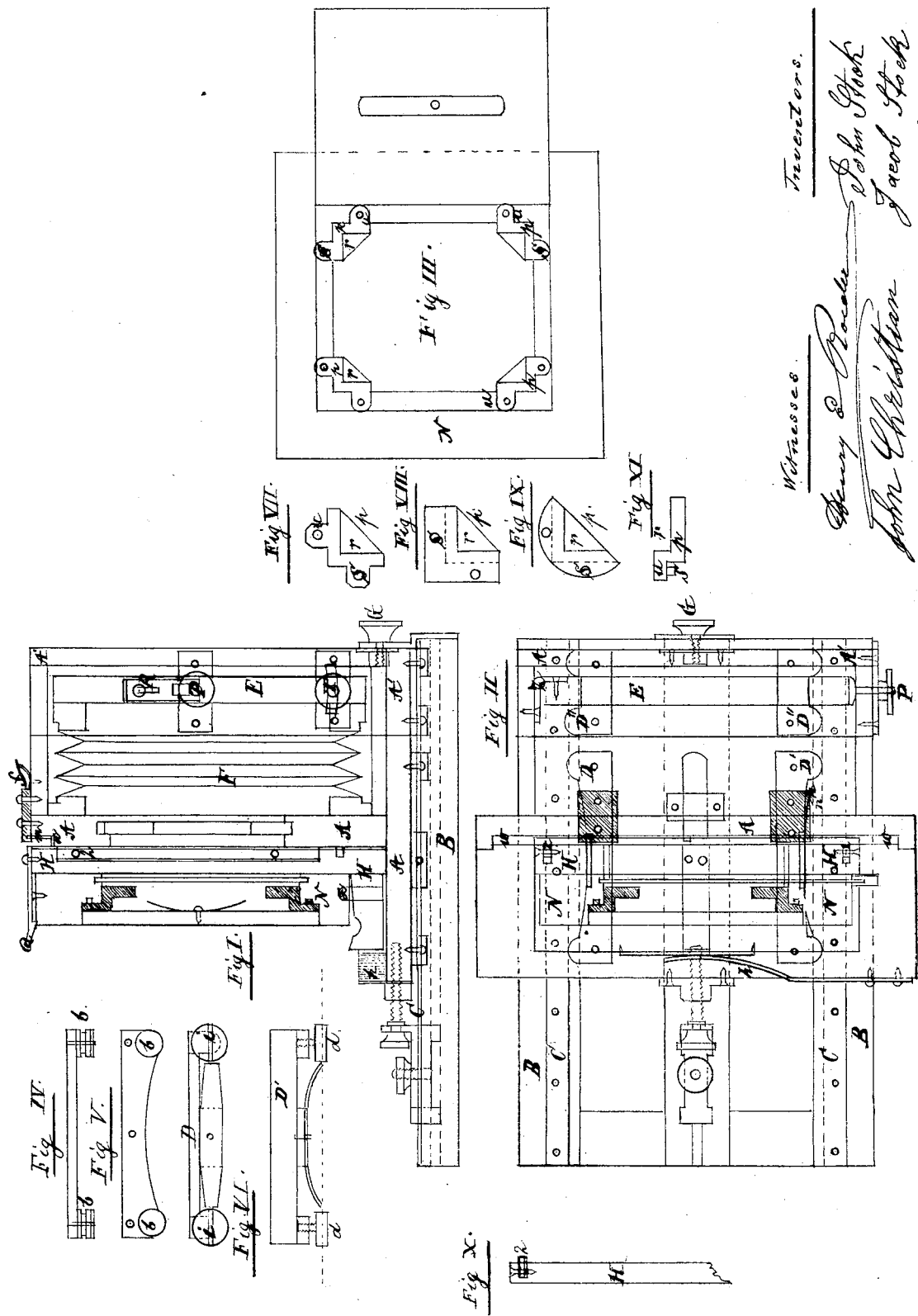

UNITED STATES PATENT OFFICE.

JOHN STOCK AND JACOB STOCK, OF NEW YORK, N. Y.

IMPROVEMENT IN PHOTOGRAPHIC CAMERAS.

Specification forming part of Letters Patent No. 115,655, dated June 6, 1871.

*To all whom it may concern:*

Be it known that we, JOHN STOCK and JACOB STOCK, both of New York city, in the county and State of New York, have invented certain Improvements in Camera, of which the following is a specification:

Figure I represents a longitudinal section of our improved photographic camera, embodying our invention. Fig. II is a plan of the same, in section. Fig. III represents the frame, showing the corners. The other figures represent details, and will be referred to in the specification.

Similar letters represent similar parts in all the figures.

This invention consists in the arrangement of the camera sliding on its frame on suitable ways attached to the inside of the framing, in combination with a spring, whereby the guides are always kept tight against said way, so as to counteract and allow for any alteration resulting from the effects of the weather. Further, our invention consists in the arrangement and construction of the front plate, to which the object-glass is attached, whereby the same may be moved in any desired direction.

In the accompanying drawing, A represents the camera-box sliding upon the frames B, on suitable ways C, attached to the inner sides of the frames B. On the under side of the box A guiding blocks or frames D D′ are attached, fitting on the ways or guides C. The blocks D are made to fit tight into or over the ways C, while the blocks D′ are fitted loosely, and are provided with a spring, n, bearing against the ways, forcing, thereby, the blocks D always tight against their respective ways, and in that manner keep the camera-box steady, even if the wooden frame-work should shrink or expand a little in consequence of the state of the weather. The forward end A′ of the camera, containing the front plate E, is connected with the after part A in the usual manner by means of expanding bellows F, (see Fig. I,) and has similar blocks D″ attached on its under side, working in the ways or guides C, and is firmly secured to the framing B by means of the screw G. Instead of constructing the guide-blocks D and D′ in the manner above described, rollers or wheels b b (see Figs. IV and V) may be used; or screws d d may be screwed into the body D and D′, (see Fig. VI,) having a longitudinal cut, i, in their heads, into which the ways or guides C are made to fit. On the upper part, at the front of the camera A, a recess, w, is made, in which the plate or frame H works. This frame H is provided at its top with a guide, m, running in suitable blocks attached to the top of the camera-box, and is acted upon by a spring, h, attached to the lower part of the camera to hold said frame H tight against the face of the box A. The guide m is provided with suitable notches, into which a spring-lever, f, attached to the top of camera-box A, is made to fit, to fix said frame H in any desired position against the face of the camera-box. Around the opening in this frame H small strips 2 (see Fig. X) are arranged in suitable recesses, acted upon by springs, or covered with velvet or any other suitable material, to prevent the entrance of light into the camera-box. Upon the bottom of this frame H the plate-holder N is fixed, fitting over pins x, and secured in its place by the spring-lever Q attached to the top of the frame H. The plate-holder N is provided with corners p, (see Fig. III,) having square recesses r, into which the prepared plate fits. These corners are provided with half-circular lugs u, fitting into suitable recesses in the frame-work, as well as with projecting pins s, whereby these corners are held perfectly tight in the plate-holder. These corners may be made with lugs having corners, (see Fig. VII,) and provided with the steady-pins s; or square or circular flanches y, (see Figs. VIII and IX,) provided with similar steady-pins s, may be used. The front plate E, attached to the forward end of the bellows F, and situated in the forward end A′ of the camera plate-holder box, is on one side hinged, at z, to the inside of said forward part A′, said hinge z being attached to the plate-holder box A′ only with one bolt or screw, around which the hinge z, with the plate E, can turn. On the opposite side, on the plate E, about in a line with the bolt or screw which fastens the hinge z to the plate-holder box A′, a bolt, P, is fastened to the plate E, passing through the side of the box A′, and provided with a suitable nut, by which said bolt P the plate E may be moved so as to turn on its hinge z, and fixed by means of the nut in any desired position. A sliding plate, R, fitted against the outside of the plate-holder box A', is made to pass over the bolt P when in its central position, to hold the bolt P, so as to allow the plate to turn on this bolt P and the screw fastening the hinge. Near the bottom of the plate E a bolt, T, is attached to the same, passing through the side of the box A', and provided with a suitable tightening-nut, for the purpose of moving the plate E in any desired direction, turning upon the bolt P, and to fix it in this position.

What we claim as our invention, and desire to secure by Letters Patent, is—

1. The arrangement of the ways C on the inner sides of the frame B, to guide the camera-box, in combination with the blocks D and D' and spring $n$, or their equivalents, attached to the bottom of the camera-box, substantially as and for the purpose hereinbefore set forth.

2. The corners $p$, constructed with projections or lugs $u$, in combination with pins $s$, substantially as and for the purpose described.

3. The plate E, in combination with its hinge $z$, bolt P, sliding plate R, and bolt T with tightening-nuts, substantially as and for the purpose hereinbefore set forth.

JOHN STOCK.
JACOB STOCK.

Witnesses:
HENRY E. ROEDER,
LIONEL SOLOSMID.